United States Patent [19]
Brown

[11] 3,964,437
[45] June 22, 1976

[54] DOG OR ANIMAL TOILET

[76] Inventor: Kenneth Jewett Brown, 39 Blackford Ave., Yonkers, N.Y. 10704

[22] Filed: Dec. 9, 1974

[21] Appl. No.: 530,678

[52] U.S. Cl. .................................................... 119/1
[51] Int. Cl.² ........................................ A01K 29/00
[58] Field of Search .................. 119/1; 4/1, 6, 7, 99

[56] References Cited
UNITED STATES PATENTS

| | | |
|---|---|---|
| 2,464,580 | 3/1949 | Johnson .................................. 119/1 |
| 3,835,812 | 9/1974 | Edwards .................................. 119/1 |

*Primary Examiner*—Louis G. Mancene
*Assistant Examiner*—J. N. Eskovitz

[57] ABSTRACT

An animal toilet suitable for installation indoors or outdoors by connection to a sewer disposal system includes an empty funnel shaped weather proof receptacle large enough for an animal to stand in and relieve himself. In the center of the receptacle over the drain is an upright member protecting same and serving as a urinating pole. A railing barrier circles the receptacle as a safeguard to pedestrians while serving as a means to lift the entire toilet when necessary. A button operated flushometer which can be made frost free provides pressurized water entering the side of the receptacle in a centripetal direction and the water forms a whirlpool vortex around the receptacle washing and scouring same while draining feces and litter down the sewer disposal system.

10 Claims, 3 Drawing Figures

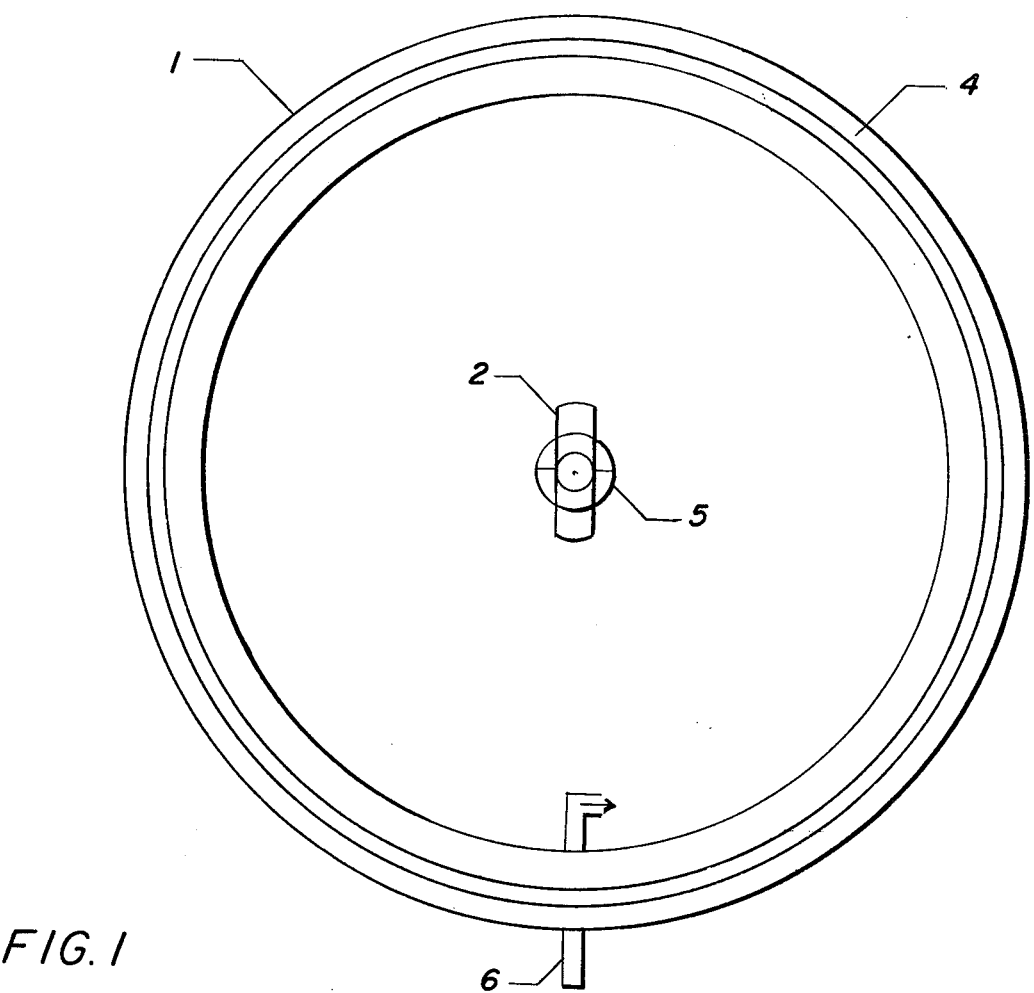
FIG. 1
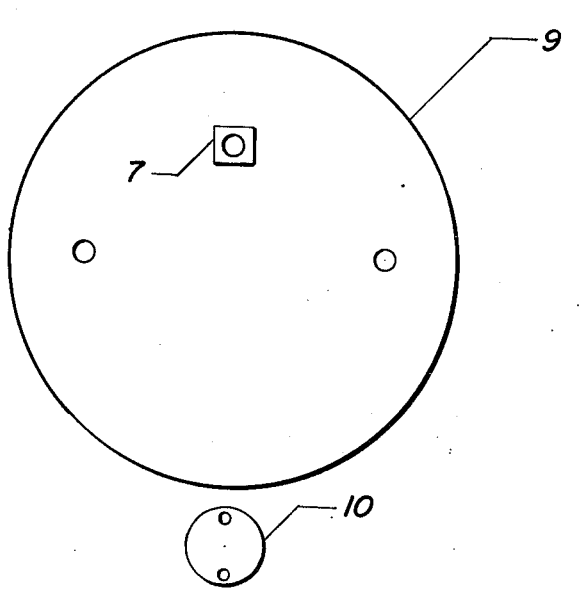

DOG OR ANIMAL TOILET

This invention provides a way and a place to collect dog or animal excrement and wash it down into the sewer system in a sanitary manner.

BACKGROUND OF INVENTION:

More and more there is a problem, in urban areas especially, caused by animal excrement. This is an environmental problem, a health problem and a public works problem. There is a great need for solving same. Solutions in the past have been to dump excrement in the gutter and have it washed down the storm sewers when it rains or by street cleaning apparatus.

Heretofore animal toilets have been devised. Prior art, however have been of unduly complicated design and frighten and endanger dogs. They are practically unworkable without constant maintenance and some require electrical power with the resultant expense and danger. Some also require moving parts that wear out and must be replaced. They are not vandal proof and the existing art is subject to stoppages, freeze ups, and are not practical for solving the public needs for inexpensive, sanitary, fool proof removal of dog feces and urine and are a danger to dogs and their owners.

SUMMARY OF INVENTION:

This invention provides a receptacle that is used for dogs or animals to relieve themselves in. Then the owner presses a foot pedal which releases a flush of water that washes the excrement down to the sewer disposal system.

It is an object of the present invention to provide an improved dog toilet that will solve the problem of dog feces on public streets and sidewalks in urban areas. The public works department will supply, install and maintain a toilet for dogs providing it is sanitary, that it works, that it is weather proof, vandal proof, safe and relatively inexpensive. Many home owners are looking for the same dog toilet for their basement and the apartment house tenant is in even more need.

It is an object of this invention to provide same.

a further object of the invention is to provide a dog toilet that will be an improvement upon all prior art with regard to its simplicity and durability which may be installed publicly for public use without fear of damage from the elements or danger to the users.

It is further an object of this invention to provide a hydrant, post or tree that will influence dogs to urinate directly into the sewer system.

It is further an object of this invention to provide a suitable working dog toilet unit for inside use with manual control.

DESCRIPTION OF DRAWINGS:

FIG. 1 is a plan view of the entire invention.

Figure 2:
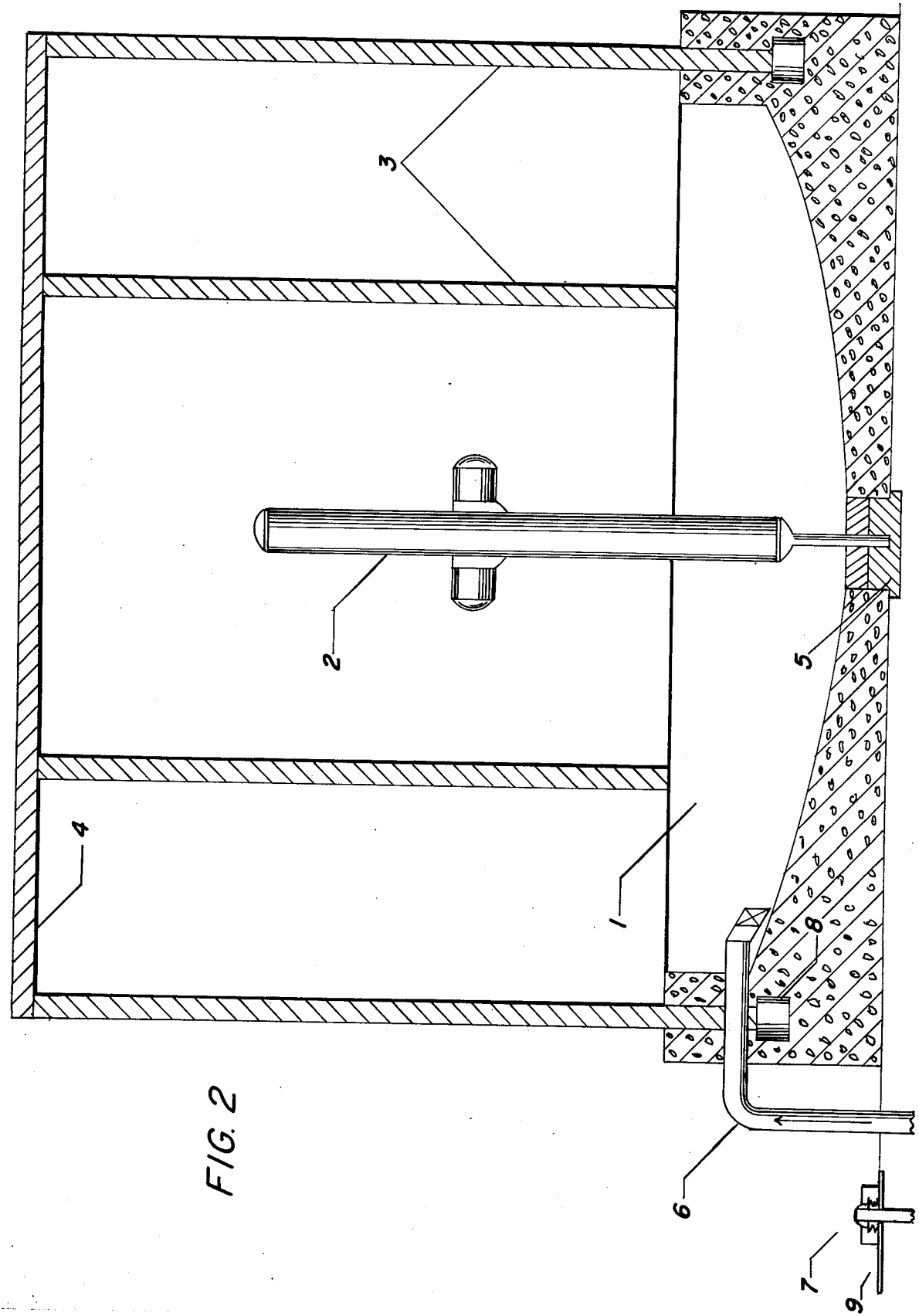
FIG. 2 is an elevation cut away showing unit at ground level.
Figure 3:
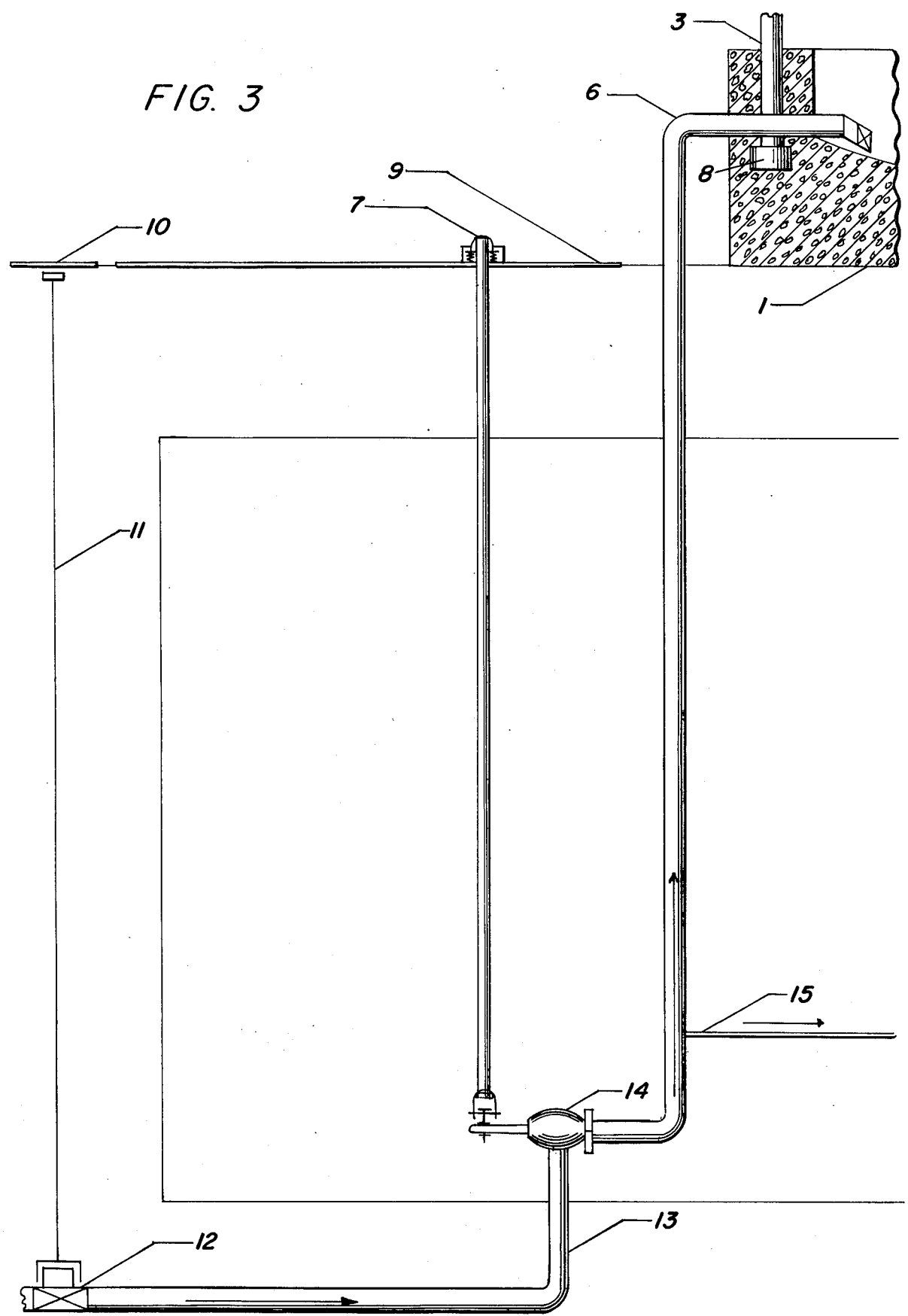
FIG. 3 is an elevation cut away showing below ground for outside use.

Referring to the drawings in more detail, the receptacle 1 is to be made of concrete for outside usage, and is to be coated with a commercial marine resin, or terazzo, or tile, or some glazing or very smooth, hard surface, so that excrement will not stick, and will be flushed off and down the drain 5. For outside use, the receptacle 1 should be vandal proof or as nearly so as possible. For inside use the receptacle 1 may be made of vitreous china, or fibre glass, or some other suitable material. The receptacle 1 may be placed over a sewer drain, cover hole on the sidewalk, over a corner sewer catch basin, or a suitable trap or sump may be constructed and connected to a disposal system. For inside installation, the receptacle 1 may be connected to a trap into the main sewer system.

The simulated hydrant, post or tree 2 is placed in the bottom of the receptacle 1. Its purpose is to provide a urinating pole for male animals. The urine naturally drains off. The scent remains, and is a lure or attraction for other animals to use the toilet.

The ballisters 3 are used to keep people from falling over or into the dog toilet, as is also the railing 4. The bottom railing 8 is used as a circular reinforcement rod for the receptacle 1 and the entire unit may be lifted with a crane by passing a bar through the top railing 4. The ballisters 3 and the railing 4 may be eliminated on the indoor model.

The drain 5 is used to hold the hydrant 2 and to connect to a trap if used.

The inlet pipe 6 runs from the flushometer 14 up to and into the receptacle 1 and the water washes around and down the drain 5.

The push button device 7 activates the flushometer 14. On the outside models it is foot operated, and on the inside models, it may not be used, but a hand operated flushmometer 14 may be used.

The man-hole cover 9 is used only on the outside model, and is for the purpose of removal and repair of the flushometer 14 and piping 6.

The curb box cover 10 covers the curb cock 12, where the water line comes in from the water main on the outside model.

The water shutoff key is 11, and the valve is 12. The water supply is 15. On the inside model, this piping 13 will come off the house water main rather than the city water main.

The flushometer 14 may be made frost free by locating same below the local freeze line, and by equiping same with a weep line and valve 15. On indoor models, or where frost is not a problem, no weep line 15 is used and the flushometer 14 may be located in a more accessible location.

I claim:

1. A dog or animal toilet comprising:
   an empty receptacle with a funnel like shape slanting down towards a drain at the bottom for connection to a sewerage disposal system;
   a selectively operable flushing system with pipe means delivering water to the receptacle in a centripetal direction, with whirlpool action so as to wash down excrement and to clean and scour its surface;
   a control means to activate the flushing system;
   a protective barrier for the receptacle;
   an upright member located over the drain hole for the animals to urinate on and said urine will drain by gravity into the sewerage disposal system and because of the upright member's location over the drain it will prevent the animal from stepping into the drain.

2. The invention defined in claim 1 including drip valve means for allowing water to drain out of said pipe means and thereby making the flushing system frost free.

3. The invention defined in claim 1 including a cover means co-operating with the flushing system to allow easy access to said system and to protect against vandalism, the use of quick coupling devices to allow for easy detachment of said cover means and said flushing system.

4. The invention defined in claim 1 with the drain being equipped with a strainer and a holder for the upright member.

5. The invention defined in claim 1 including means for connecting said drain into a sewer, man hole, or sump on the sidewalk.

6. The invention defined in claim 1 with adaptors and main curb shut off valve for coupling the flushing system to the municipal water service.

7. The invention defined in claim 1 including means for connecting said flushing system and drain to water lines and storm and sanitary pipes necessary for installing the receptacle in aprtment house basements, roofs or in private homes indoors or outdoors.

8. The invention defined in claim 1 wherein said operable flushing system is devoid of moving parts above ground except for a button to push.

9. The invention defined in claim 1 with nozzle means connectable to the inlet pipe for providing a jet stream of water for breaking up and flushing excrement down the drain.

10. The invention defined in claim 1 including means to manually activate said control means.

* * * * *